United States Patent
Ott

(10) Patent No.: US 7,413,720 B2
(45) Date of Patent: Aug. 19, 2008

(54) CATALYST AND METHOD FOR REDUCTION OF NITROGEN OXIDES

(75) Inventor: Kevin C. Ott, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 365 days.

(21) Appl. No.: 11/385,140

(22) Filed: Mar. 20, 2006

(65) Prior Publication Data

US 2006/0159607 A1 Jul. 20, 2006

Related U.S. Application Data

(63) Continuation-in-part of application No. 10/899,749, filed on Jul. 27, 2004, now Pat. No. 7,378,069.

(60) Provisional application No. 60/663,065, filed on Mar. 18, 2005.

(51) Int. Cl.
  *B01D 53/56* (2006.01)
  *B01D 53/94* (2006.01)
  *F01N 3/10* (2006.01)

(52) U.S. Cl. ............... 423/239.1; 423/213.2; 423/213.5; 423/213.7; 423/239.2; 60/274; 60/282; 60/299

(58) Field of Classification Search ............... 423/213.2, 423/213.5, 213.7, 239.1, 239.2; 60/274, 60/282, 299
See application file for complete search history.

(56) References Cited

U.S. PATENT DOCUMENTS

| 4,220,632 | A | 9/1980 | Pence et al. |
|---|---|---|---|
| 4,778,665 | A | 10/1988 | Krishnamurthy et al. |
| 4,961,917 | A | 10/1990 | Byrne |
| 5,024,981 | A | 6/1991 | Speronello et al. |
| 5,077,026 | A | 12/1991 | Nair et al. |
| 5,312,608 | A * | 5/1994 | Hayasaka et al. ........ 423/213.5 |
| 5,451,387 | A | 9/1995 | Farnos et al. |
| 5,482,692 | A | 1/1996 | Audeh et al. |
| 5,516,497 | A | 5/1996 | Speronello et al. |
| 5,520,895 | A | 5/1996 | Sharma et al. |
| 5,552,129 | A | 9/1996 | Farnos et al. |
| 5,589,147 | A | 12/1996 | Farnos et al. |
| 5,776,423 | A | 7/1998 | Feeley et al. |

(Continued)

OTHER PUBLICATIONS

Byrne et al.., "Selective Catalytic Reduction of $NO_x$ Using Zeolitic Catalysis For High Temperature Application," Catalysis Today, 13 (1992) 33-42.

(Continued)

*Primary Examiner*—Timothy C Vanoy
(74) *Attorney, Agent, or Firm*—Samuel L. Borkowsky

(57) ABSTRACT

A Selective Catalytic Reduction (SCR) catalyst was prepared by slurry coating ZSM-5 zeolite onto a cordierite monolith, then subliming an iron salt onto the zeolite, calcining the monolith, and then dipping the monolith either into an aqueous solution of manganese nitrate and cerium nitrate and then calcining, or by similar treatment with separate solutions of manganese nitrate and cerium nitrate. The supported catalyst containing iron, manganese, and cerium showed 80 percent conversion at 113 degrees Celsius of a feed gas containing nitrogen oxides having 4 parts NO to one part $NO_2$, about one equivalent ammonia, and excess oxygen; conversion improved to 94 percent at 147 degrees Celsius. $N_2O$ was not detected (detection limit: 0.6 percent $N_2O$).

1 Claim, 7 Drawing Sheets

U.S. PATENT DOCUMENTS 6,276,132 B1    8/2001    Kanesaka et al.
6,514,470 B1    2/2003    Ott et al.

OTHER PUBLICATIONS

Long et al., "Low Temperature Selective Catalytic Reduction (SCR) of NO with $NH_3$ Over Fe-Mn Based Catalysts," Chem. Commun., 2002, 452-453.

Qi et al., "Low-Temperature SCR of NO with $NH_3$ Over USY-Supported Manganese Oxide-Based Catalysts." Catalysis Letters vol. 87, Nos. 1-2, Apr. 2003.

Qi et al., "A Superior Catalysts For Low-Temperature NO Reduction with $NH_3$." Chem. Commun., 2003, 848-849.

* cited by examiner

CATALYST AND METHOD FOR REDUCTION OF NITROGEN OXIDES

RELATED CASES

This application is a continuation in part of U.S. patent application Ser. No. 10/899,749 entitled "Catalyst and Method for Reduction of Nitrogen Oxides," filed Jul. 27, 2004, now U.S. Pat. No. 7,378,069 hereby incorporated by reference. The application also claims the benefit of U.S. patent application Ser. No. 60/663,065 entitled "Catalyst and Method for Reduction of Nitrogen Oxides," filed Mar. 18, 2005, hereby incorporated by reference.

STATEMENT REGARDING FEDERAL RIGHTS

This invention was made with government support under Contract No. W-7405-ENG-36 awarded by the U.S. Department of Energy. The government has certain rights in the invention.

FIELD OF THE INVENTION

The present invention relates generally to the abatement of nitrogen oxides and more particularly to the Selective Catalytic Reduction (SCR) of nitrogen oxides using a zeolite catalyst impregnated with iron, cerium, and manganese.

BACKGROUND OF THE INVENTION

It is generally recognized that nitric oxide (NO), nitrogen dioxide ($NO_2$), and nitrous oxide ($N_2O$) are principle contributors to smog and other undesirable environmental effects when they are discharged into the atmosphere. $NO_x$ is the term generally used to represent nitric oxide (NO), nitrogen dioxide ($NO_2$), and nitrous oxide ($N_2O$), as well as mixtures containing these gases. $NO_x$ forms in the high temperature zones of combustion processes. The internal combustion engine, and coal or gas-fired or oil-fired furnaces, boilers and incinerators, all contribute to $NO_x$ emissions. Although the concentrations of $NO_x$ in the exhaust gases produced by combustion usually are low, the aggregate amount discharged in industrial and/or highly populated areas tends to cause problems. $NO_x$ is also produced during a variety of chemical processes such as the manufacture of nitric acid, the nitration of organic chemicals, the production of adipic acid, and the reprocessing of spent nuclear fuel rods.

In general, fuel-rich combustion mixtures produce exhaust gases with less $NO_x$ than do lean fuel-air mixtures, i.e. mixtures in which more air is provided than the stoichiometric amount required to completely combust the fuel. Lean fuel mixtures will produce an exhaust gas that contains gaseous oxygen.

The US Environmental Protection Agency is requiring greater levels of $NO_x$ abatement from mobile and stationary emission sources. For 'light duty' mobile sources such as light trucks and cars, $NO_x$ emissions will be required to not exceed 0.07 grams/mile, down from the current level of around 0.8 grams/mile. This represents a $NO_x$ abatement requirement of greater than 90% over current technology. Some of this abatement will come from advanced vehicle design and advances in combustion technology, but most of the reduction will come from advanced emission controls of which $NO_x$ reduction catalysts are the central technology. Similar reductions will be required of heavy diesel trucks in the near future, hence the need for new technologies having the capability of achieving very high reduction of $NO_x$ from lean burn engines, and at low operating temperatures as well (150° C.-250° C.).

Although the $NO_x$ gases may be thermodynamically unstable with respect to decomposition into elemental oxygen and nitrogen, no simple, economical method or catalyst has been described for inducing this decomposition at high enough rates over broad temperature ranges to make lean $NO_x$ reduction economically feasible. It has been discovered, however, that the addition of a reductant such as ammonia to the exhaust gas, under appropriate conditions, converts $NO_x$ to elemental nitrogen and steam.

The process of contacting an industrial flue gas with a catalyst in the presence of ammonia at a temperature usually in the range of about 200 degrees Celsius to about 600 degrees Celsius to reduce $NO_x$ in the flue gas is commonly known as the process for Selective Catalytic Reduction (SCR) of $NO_x$. Any reference made herein to "Selective Catalytic Reduction," or to "SCR," is intended to refer to a process in which a mixture of $NO_x$ and $NH_3$ are induced to react catalytically in the presence of oxygen at elevated temperatures.

For lean burn engine technology to be implemented, catalytic converters must be developed for lean burn engines. The catalyst employed in the converter must be active over a broad range of temperature (usually in the range of about 150-500 degrees Celsius, or broader is better), must have very high activity for the conversion of $NO_x$ to elemental nitrogen ($N_2$) and water ($H_2O$), must react with a broad range of NO and $NO_2$ in the gas sent from the engine to the catalytic converter, must be sulfur tolerant, and should not produce $N_2O$ or only a few ppm at most. With these goals in mind, lean burn catalysts that remove $NO_x$ from exhaust streams (i.e. de$NO_x$ catalysts) are highly sought after and are the focus of considerable research worldwide.

A rather narrow window of satisfactory operating temperatures has characterized most catalysts for lean burn applications. Specifically, they only effectively convert $NO_x$ over narrow temperature ranges that do not always match the temperatures at which the $NO_x$ is emitted. Some of the better catalyst materials have included metal-substituted zeolite catalysts such as Cu-ZSM-5, Fe-ZSM-5, and related catalysts consisting of various zeolites with metal ions substituted into the zeolite structure. These materials are better in some ways than conventional platinum-based de$NO_x$ catalysts, but usually the best operating temperature ranges are too high (above 400 degrees Celsius) and too narrow (only about a hundred degrees Celsius in effective temperature width) for many practical applications. One significant advantage that such 'base metal' (non-precious metal) zeolite catalysts have over Pt or other precious metal-containing catalysts (e.g. Pt, Pd, Rh, Ir) is that precious metal containing catalysts are known to produce copious quantities of $N_2O$ in addition to $N_2$ under lean burn conditions. $N_2O$ emissions are not yet regulated, but because $N_2O$ is a potent greenhouse gas, it is a very undesirable byproduct, and a technologically useful catalyst should produce little, if any $N_2O$.

It has been recognized that the mechanism of SCR of $NO_x$ in the presence of ammonia requires an approximately 1:1 ratio of NO to $NO_2$ in the feed stream to achieve the highest rates of $NO_x$ reduction. Ratios above or below 1 result in significantly slower rates of $NO_x$ reduction. As combustion processes generate $NO_x$ mixtures having very high NO/$NO_2$ ratios, i.e. the engine emits mostly NO, a process for reduction of the NO must include a method for oxidizing some of the NO to $NO_2$; preferably about half of the NO should be converted, resulting in a nearly 1:1 ratio.

Emissions control systems for mobile applications are likely to have an oxidation catalyst upstream from the $NO_x$ reduction catalyst to oxidize unburned hydrocarbons. This oxidation catalyst will convert some of the NO into $NO_2$, perhaps up to 20 to 30 percent at a temperature of about 150 degrees Celsius, but not the 50 percent required to achieve the fastest rates of $NO_x$ reduction. Because most $NO_x$ catalysts are not capable of oxidizing NO to $NO_2$ at low temperature, these catalysts cannot assist the hydrocarbon oxidation catalyst to generate the advantageous mixture of $NO/NO_2$ and so these catalysts are largely ineffective at low temperatures, that being below 300 degrees Celsius where the feed contains mostly NO.

A strategy for improving the low temperature activity of SCR catalysts is to provide an additional non-precious metal containing catalyst that can oxidize NO to $NO_2$ so that the highest rates of $NO_x$ reduction can be realized. This is a strategy employed with the present invention.

In addition, internal combustion engines emit a large amount of unburned hydrocarbons during cold engine start-up. In fact, a large fraction of the total emitted hydrocarbons released during the first minutes of engine operation are due to the uncombusted hydrocarbons. Such release of hydrocarbons after cold engine start-up poses a special problem, as at that point the temperatures of the exhaust gas and the catalytic converter are generally not high enough for conversion of the gaseous pollutants by conventional catalysts. The catalysts in present catalytic converter systems are generally ineffective at ambient temperatures and must reach high temperatures, often in the range of 300 degrees Celcius to 400 degrees Celcius, before they become effective. During this time period, unburned hydrocarbons may adsorb onto the catalyst, causing a further diminution in activity. Indeed, under some circumstances, the adsorbed hydrocarbons may form carbonaceous deposits, requiring high temperatures to remove the deposit oxidatively. This can lead to irreversible damage of the catalyst. Therefore, catalysts that can avoid hydrocarbon deposition at low temperature, or more preferably, oxidize unburned hydrocarbons at the lower temperatures, are highly desired.

SCR processes offer the possibility that unspent ammonia reductant could be emitted to the environment. As ammonia is a regulated toxic substance, there are stringent emissions standards for ammonia. Therefore, another desired feature for a broad temperature range SCR process is one in which very little, if any ammonia is allowed to escape into the atmosphere, even under strenuous transient conditions where the process temperature is increasing rapidly because of load on the engine. In other words, the catalytic $NO_x$ reduction process should consume all of the ammonia, or the catalyst should consume any excess ammonia by oxidation. In the latter case, it would be highly advantageous if the oxidation of any excess ammonia did not result in the formation of more $NO_x$, but that the oxidation process resulted in the net oxidation of ammonia to $N_2$ — a so-called selective catalytic oxidation process.

A number of zeolite-based catalysts for SCR of $NO_x$ with ammonia are described below. Many of these catalysts where their activity is given have been tested in the forms of powders or compacted powders. In these catalytic tests, the flows through the catalyst beds are given in terms of gas hourly space velocity (GHSV). The GHSV is the volume of exhaust passed in one hour divided by the volume of the catalyst bed, and is related to the residence time or reaction time that the gaseous species have to react on the catalyst before they leave the catalyst bed. It is generally desirable to minimize the catalyst volume to the extent possible, and a useful catalyst should have high activity at high GHSV. For combustion processes, the GHSV is typically in a range from about 20,000 $h^{-1}$ to about 200,000 $h^{-1}$. One difficulty in comparing the activity of one catalyst to another when relative flow rates are given in terms of GHSV arises when one tries to compare a compacted powder catalyst with a catalyst that is supported on a monolith. In a powder catalyst, the bed volume is measured in a straightforward manner. If the catalyst is supported on a monolith such as a commercial cordierite honeycomb support, then the catalyst volume is given as the volume of the honeycomb. The problem here is that the amount of catalyst supported on the honeycomb is very small; most of the volume of the honeycomb catalyst is void space and the volume of the honeycomb itself. This makes it very difficult to make a simple comparison of catalyst activity between a powder catalyst and a monolith-supported catalyst. A rule of thumb that is commonly used is to make a rough comparison in activity between a powder catalyst and a monolith catalyst is to multiply the GHSV of the powder catalyst by about 4, or conversely to divide the GHSV of the monolith catalyst test result by about 4. For example, if a powder catalyst is reported to have a certain activity at 30,000 $h^{-1}$ GHSV, then it should be compared to a monolith catalyst at roughly 7,500 $h^{-1}$ GHSV. Conversely, if a monolith catalyst has been reported to have a certain activity at 30,000 $h^{-1}$ GHSV, then the powder catalyst should be compared at a GHSV of about 120,000 $h^{-1}$.

The use of zeolite-based catalysts for the SCR of nitrogen oxides with ammonia is well established. U.S. Pat. No. 4,220,632 to D. R. Pence et al. entitled "Reduction of Nitrogen Oxides With Catalytic Acid Resistant Aluminosilicate Molecular Sieves and Ammonia," incorporated by reference herein, discloses the catalytic reduction of noxious nitrogen oxides in a waste stream (stack gas from a fossil-fuel-fired power generation plant or other industrial plant off-gas stream) using ammonia as reductant in the presence of a zeolite catalyst in the hydrogen or sodium form having pore openings of about 3 to 10 Angstroms.

U.S. Pat. No. 4,778,665 to Krishnamurthy et al. entitled "Abatement of $NO_x$ in Exhaust Gases," incorporated by reference herein, describes an SCR process for pretreating industrial exhaust gases contaminated with $NO_x$ in which the catalyst includes an intermediate pore zeolite with a silica to alumina ratio of at least 50 with a Constraint Index of 1 to 12. These zeolites are sometimes referred to as ZSM-5 type zeolites. The zeolite is preferably in the hydrogen form or has up to about 1 percent of a platinum group metal. According to the '665 patent, the hydrogen form of zeolite ZSM-5 (HZSM-5) catalyzes the SCR reaction at temperatures between about 400 degrees Celsius to about 500 degrees Celsius. At temperatures below about 400 degrees Celsius, HZSM-5 is significantly less efficient at removing nitrogen oxides from the gas stream. These catalysts were tested as compacted powder extrudates at space velocities below 10,000 $h^{-1}$.

U.S. Pat. No. 5,520,895 to S. B. Sharma et al. entitled "Method for the Reduction of Nitrogen Oxides Using Iron Impregnated Zeolites," which issued on May 28, 1996 and is hereby incorporated by reference, describes a process employing impregnated zeolites as catalysts for the SCR of NO in exhaust gas. A catalyst used with this process includes an intermediate pore size zeolite powder that has been contacted with a water-soluble iron salt or salt precursor to produce an iron loading of at least 0.4 weight percent, and a binder such as titania, zirconia, or silica. The impregnated zeolite is calcined and hydrothermally treated at a temperature of about 400-850 degrees Celsius to produce a catalyst that is capable of greater than 80 percent conversion of the $NO_x$ to innocuous compounds when the catalyst has been aged using 100 percent steam at 700 degrees Celsius for 7 hours prior to sending the exhaust gas over the catalyst. These catalysts were tested as powders at space velocities of 12,000 $h^{-1}$.

U.S. Pat. No. 6,514,470 to K. C. Ott et al. entitled "Catalysts for Lean Burn Engine Exhaust Abatement," hereby incorporated by reference, describes the catalytic reduction of nitrogen oxides in an exhaust stream gas using a reductant material and an aluminum-silicate type catalyst having a minor amount of a metal. Nitrogen oxides were reduced in the exhaust stream gas by at least 60 percent at temperatures within the range of from about 200 degrees Celcius to about 400 degrees Celcius. The term "hydrocarbons" as it is used both in the '470 patent and in the present patent application, is meant to refer to hydrocarbons and also to partially oxidized products of hydrocarbons such as oxygenated hydrocarbons (alcohols, ketones, and the like). While hydrocarbons were used as the reductant in the examples disclosed in the '470 patent, it was mentioned that ammonia could also be used. However, no data using ammonia as reductant was presented.

In "A Superior Catalyst for Low-Temperature NO Reduction With $NH_3$," Chem. Communications, (2003), pp. 848-849, incorporated by reference herein, Gongshin Qi and Ralph T. Yang report an SCR process using a Mn—Ce mixed-oxide powder catalyst that yields nearly 100 percent NO conversion at 100-150 degrees Celsius at a space velocity of 42,000 $h^{-1}$ (as a powder), and that $SO_2$ and water have only slight effects on the activity. The catalyst activity was shown to be dependent on the relative amount of Mn in the catalyst, and also on the calcination temperature used to prepare the catalyst.

In "Low-Temperature SCR of NO With $NH_3$ over USY-Supported Manganese Oxide-Based Catalysts," Catalysis Letters, vol. 87, nos. 1-2, April 2003, pp. 67-71, incorporated by reference herein, Gongshin Qi, Ralph T. Yang, and Ramsay Chang report the SCR of NO with ammonia and excess oxygen using manganese oxide, manganese-cerium oxide, and manganese-iron oxide supported on USY (ultrastable (i.e. high Si/Al) Y zeolite). It was found that $MnO_x$/USY had high activity and high selectivity to nitrogen at temperatures of from 80-180 degrees Celsius, and that the addition of iron oxide or cerium oxide increased NO conversion. A catalyst of 14% cerium and 6% manganese impregnated into ultrastable Y zeolite produced nearly 100 percent conversion of NO at 180 degrees Celsius at gas hourly space velocity (GHSV) of 30,000 $h^{-1}$ as a powder catalyst. The only reported product was $N_2$ (with no $N_2O$) below 150 degrees Celsius.

There remains a need for catalysts that show better performance for SCR of $NO_x$, especially catalysts that reduce $NO_x$ at temperatures less than about 200 degrees Celsius at high space velocities, particularly when supported on monolith honeycomb supports.

Therefore, an object of the present invention is to provide a catalyst for the selective catalytic reduction of $NO_x$ in the presence of ammonia that shows excellent conversion at temperatures below 200 degrees Celsius at space velocities greater than 30,000 $h^{-1}$ when tested as a monolith-supported catalyst, or 120,000 $h^{-1}$ when tested as a powder.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

In accordance with the purposes of the present invention, as embodied and broadly described herein, the present invention includes a method for the Selective Catalytic Reduction of nitrogen oxides. The method involves contacting an exhaust gas stream that includes nitrogen oxides, ammonia, and oxygen, with a catalyst under conditions effective to catalytically reduce the nitrogen oxides such that less than about 0.6 percent $N_2O$ is generated. The catalyst is a medium pore zeolite that has been ion exchanged with iron to provide an efficient SCR function and impregnated with manganese and cerium to provide an efficient function for the low temperature oxidation of NO to $NO_2$ and any unburned hydrocarbons. These invention catalysts that combine these dual functions are termed 'hybrid' catalysts, as they are hybrids of SCR catalysts and potent NO oxidation catalysts.

The invention also includes a supported catalyst effective for the Selective Catalytic Reduction of nitrogen oxides in the presence of ammonia. The catalyst is supported on a monolith, and includes ZSM-5 zeolite that has been exchanged with iron and impregnated with manganese and cerium.

The invention also includes a method for catalytically reducing nitrogen oxides in an exhaust gas stream that contains nitrogen oxides, ammonia, and oxygen. The method involves contacting the exhaust gas stream under conditions effective to catalytically reduce the nitrogen oxides with Fe-ZSM-5 catalyst and thereafter with a second catalyst. The second catalyst includes a medium pore zeolite ion that has been ion exchanged with iron and impregnated with manganese and cerium.

The invention also includes a method for improving the low temperature performance of a lean $NO_x$ trap. The method involves putting a catalyst upstream of a lean $NO_x$ trap. The catalyst is a medium pore zeolite impregnated with iron, cerium, and manganese. When the catalyst is contacted with NO and oxygen, it substantially oxidizes the NO to $NO_2$ to produce a $NO_2$ enriched stream that improves the low temperature performance of the lean $NO_x$ trap.

BRIEF DESCRIPTION OF THE DRAWINGS

The accompanying drawings, which are incorporated in and form a part of the specification, illustrate the embodiment(s) of the present invention and, together with the description, serve to explain the principles of the invention. In the drawings:

FIG. 2 shows that the invention catalysts are superior catalysts for the oxidation of NO to $NO_2$ at low temperatures, which is a requirement for achieving high rates of $NO_x$ conversion by SCR in the presence of ammonia.

DETAILED DESCRIPTION

Figure 1:
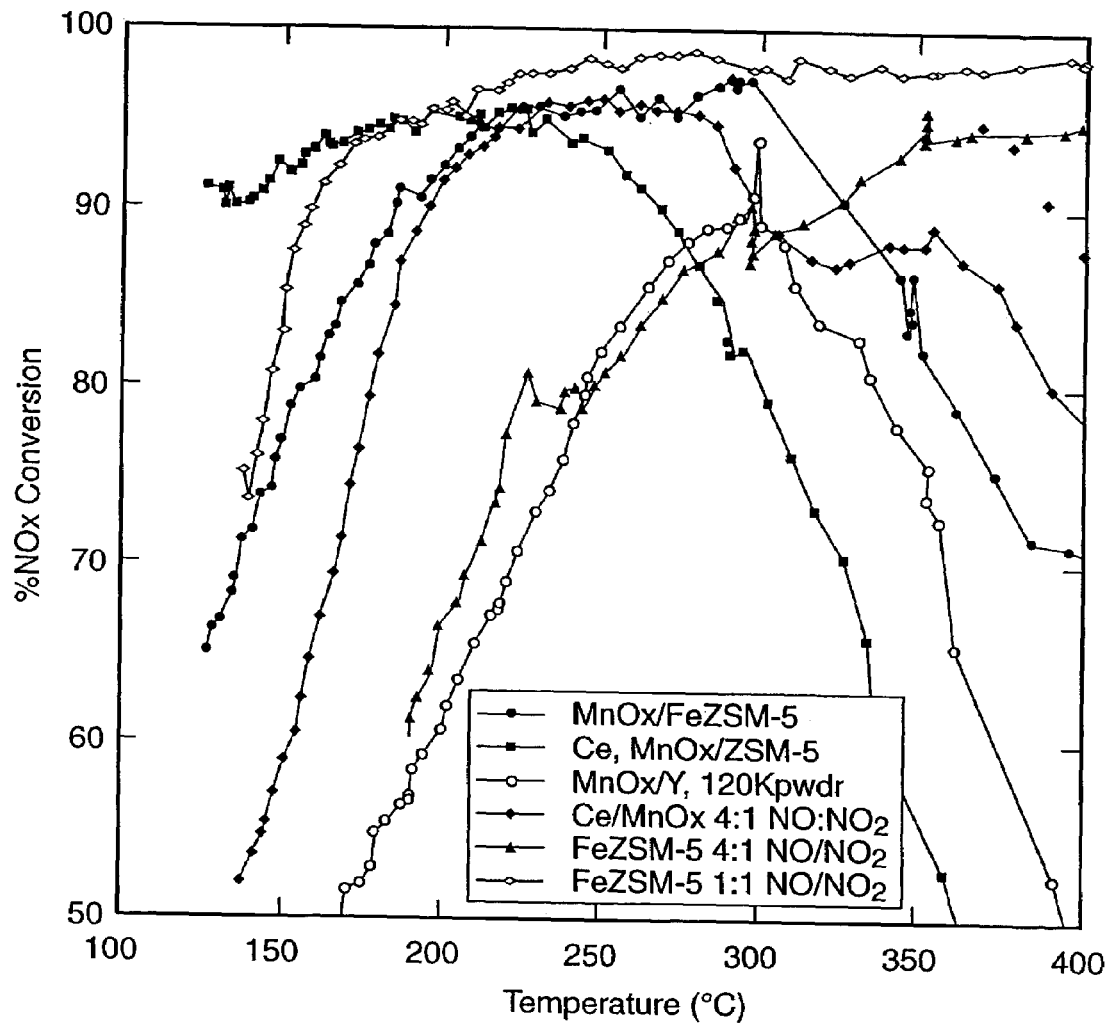
FIG. 1 shows a graphical representation of percent $NO_x$ conversion as a function of temperature at a gas hourly space velocity (GHSV) of 30,000 $hr^{-1}$ (monolith) and in a temperature range from 100 degrees Celsius to 400 degrees Celsius for the following catalysts and $NO_x$ compositions: FeZSM-5/$MnO_x$, 4:1 $NO/NO_2$ (filled circles); FeZSM-5/$CeO_x$/$MnO_x$, 4:1 $NO/NO_2$ (filled squares); powder catalyst $MnO_x$ supported on Y zeolite, 120,000 $hr^{-1}$ (hollow circles); Ce/MnO supported on Y zeolite, 4:1 $NO/NO_2$ (filled diamonds); FeZSM-5, 4:1 $NO/NO_2$ (filled triangles); and FeZSM-5, 1:1 $NO/NO_2$ (hollow diamonds).

The invention relates to the Selective Catalytic Reduction (SCR) of $NO_x$ in the presence of ammonia and excess oxygen over a broad temperature range. The invention includes a catalyst that has been shown to convert gaseous mixtures of NO and $NO_2$ to $N_2$. The catalyst, an embodiment of which includes a monolith-supported medium pore zeolite ion-exchanged with small amounts of iron, manganese, and cerium, has been demonstrated as being a highly active catalyst for the conversion of $NO_x$ in the presence of ammonia in the temperature range from about 200 degrees Celsius to about 400 degrees Celsius, and shows surprising activity at temperatures below 200 degrees Celsius, which is highly desirable because state-of-the-art combustion engines are becoming so efficient that exhaust gas temperatures are dropping into the range below 200 degrees Celsius. Activity at these low temperatures is also desirable because of the emission during 'cold start' conditions, which occurs before conventional catalysts become hot enough to display effective catalytic activity.

A standard by which deNO$_x$ catalysts are currently being measured is that they perform better than the best commercial catalyst if they can provide better than 60 percent conversion at a temperature of 200 degrees Celsius when 20 percent of the feed into the catalyst is nitrogen dioxide ($NO_2$). The catalyst of the invention has been shown to meet this standard by displaying greater than 60 percent conversion of a gaseous, 4 to 1 mixture of NO/$NO_2$ at 200 degrees Celsius.

The exhaust gases that can be treated in the catalytic system of the present invention can come from the combustion of fuels in automotive engines (such as diesel engines), gas turbines, engines using an oxygen-rich mixture (lean-burn conditions), and electrical power generation stations. The term "exhaust gas" means any waste gas that is formed in an industrial process or operation and that is normally disposed of by discharge to the atmosphere, with our without additional treatment. "Exhaust gas" includes the gas produced by internal combustion engines. The composition of such a gas varies and depends on the particular process or operation that leads to its formation. When formed in the combustion of fossil fuels, it will generally include nitrogen, steam and carbon dioxide. In addition it will also contain smaller amounts of $NO_x$. The fuels can be, for example, natural gas, gasoline, LPG, kerosene, heavy oil and coal. Fuels that contain sulfur will typically produce an exhaust gas that contains one or more sulfur oxides. Rich fuel-air mixtures will generally produce an exhaust gas that contains little if any free oxygen along with some carbon monoxide, hydrocarbons (where the term 'hydrocarbons' is meant to include both hydrocarbons and partially oxidized hydrocarbons, as described earlier), and hydrogen. Lean fuel-air mixtures, which contain more air than what is stoichiometrically required to completely burn the fuel, will form an exhaust gas that contains oxygen. Other industrial processes such as nitration, uranium recovery, and calcining solid salts that contain nitrates produce exhaust gases that can have compositions different from those produced from combustion of fossil fuels. They may be substantially devoid of steam, for example, and may contain very high concentrations of nitrogen or other materials.

The conversion of $NO_2$ and NO to nitrogen in the presence of ammonia is believed to process generally according to equations (1) and (2) and (3) below.

$$2NO_2 + 4NH_3 + O_2 \rightarrow 3N_2 + 6H_2O \qquad (1)$$

$$4NO + 4NH_3 + O_2 \rightarrow 4N_2 + 6H_2O \qquad (2)$$

$$2NO + 2NO_2 + 4NH_3 \rightarrow 4N_2 + 6H_2O \qquad (3)$$

The highest rates of $NO_x$ conversion by reduction with ammonia occur when the ratio of NO to $NO_2$ is 1 (equation 3). To achieve the high rate due to the 'fast' SCR process of equation 3 from an exhaust stream that contains little $NO_2$ and mostly NO as the $NO_x$ component, sufficient NO must be first oxidized to $NO_2$ to achieve a ratio of NO to $NO_2$ that is close to 1.

The present invention is effective for treating exhaust gas containing the approximate stoichiometric amount of ammonia. The ammonia may be present in the gas, may be added to the gas, or may be produced by an upstream process (such as by decomposition of urea). The term "approximate stoichiometric amount" means from about 0.75 to about 1.25 times the molar amount of ammonia indicated in equations (1), (2), and (3) above.

In performance testing of the catalysts and processes of the present invention, a simulated exhaust gas mixture was used. Those skilled in the art will readily recognize that other variations of such simulated exhaust gas mixtures could be employed.

The exhaust gas is typically treated in the catalytic system of this invention at a temperature of from about 50 degrees Celsius to about 1000 degrees Celsius or more, e.g. within the range of within the range of about 100 degrees Celsius to about 900 degrees Celsius, e.g. of about 100 degrees Celsius to about 600 degrees Celsius, e.g. of about 120 degrees Celsius to about 600 degrees Celsius, e.g. of about 120 degrees Celsius to about 400 degrees Celsius, and at a gas hourly space velocity (GHSV, relating to volumes of gas at standard temperature and pressure (STP) per volume of catalyst per hour) adjusted to provide the desired conversion. The GHSV can be from about 1,000 to about 500,000 $hr^{-1}$, e.g. within the range of about 2,500 to about 250,000 $hr^{-1}$, e.g. from about 5,000 to about 150,000 $hr^{-1}$, e.g. from about 10,000 to about 100,000 $hr^{-1}$.

The process of the invention is operable at subatmospheric to superatmospheric pressure, e.g. from about 5 psia to about 500 psia, preferably from about 10 psia to about 50 psia, i.e. near or slightly above atmospheric pressure.

The gas mixture directed over the catalyst should contain at least a stoichiometric amount of oxygen as indicated by equations (1) and (2), or enough oxygen to convert half the NO to $NO_2$ to proceed by the way of the 'fast' SCR reaction (equation 3). Excess levels of oxygen above the stoichiometric amount may be desirable. According to the method of the invention, a source of oxygen, such as air, is sent to the catalyst along with the exhaust gas. If sufficient oxygen is not present in the exhaust gas, a source of oxygen, e.g. air, may be added to the exhaust gas, and if sufficient oxygen is present in the exhaust gas, then no air need be added to the exhaust gas.

Adequate conversion may be readily achieved with a simple stationary fixed-bed of catalyst. The fixed includes a bed of the invention catalyst, which is a ZSM-5 type zeolite having small amounts of iron, manganese, and cerium impregnated therein. This bed can be used alone, or in combination with other catalyst beds, e.g. a dual bed. A bed of the invention catalyst can be used in combination with another catalyst bed such as a FeZSM-5 catalyst bed, to provide a dual bed that may be capable of even better overall performance than a single bed over the wide range of operating conditions for a combustion engine, for example.

Suitable mixing may be used before the gas reaches the catalyst to produce a homogeneous gas mixture for catalytic conversion. The mixers may be any suitable arrangement, including, for example, baffles, discs, ceramic discs, static mixers, or combinations of these. The mixing may be integral with the gas flow paths.

Catalysts useful with the present invention typically include an active material and a support. Suitable support materials include cordierite, nitrides, carbides, borides, intermetallics, mullite, alumina, natural and synthetic zeolites, lithium aluminosilicate, titania, feldspars, quartz, fused or amorphous silica, clays, aluminates, zirconia, spinels, or metal monoliths of aluminum-containing ferrite type stainless steel, or austenite type stainless steel, and combinations thereof.

Typical substrates are disclosed in U.S. Pat. Nos. 4,127,691 and 3,885,977, incorporated by reference herein. The catalyst is combined with the substrate in any method that ensures that the catalyst will remain intact during the catalytic reaction.

A catalyst useful with the present invention comprises a medium pore zeolite, whether naturally occurring or synthesized crystalline zeolites. Preferably these zeolites are medium pore zeolites with a silica to alumina ratio of at least 50. Examples include ZSM-5, ZSM-11, ZSM-12, ZSM-21, ZSM-23, ZSM-35, ZSM-38, and ZSM-48. Preferably, the zeolite is ZSM-5.

An embodiment of the catalyst of the present invention was prepared by ion exchanging a zeolite with iron and then impregnating manganese and cerium onto the iron zeolite in a stepwise fashion. The products were tested at various stages during the preparation. First, a slurry of ZSM-5 was coated onto a monolith of cordierite monolith (the support). The slurry-coated monolith was then dried at a temperature of about 450-500 degrees Celsius. Following the drying, ferric chloride ($FeCl_3$) was sublimed onto ZSM-5 treated cordierite, after which the product was subjected to calcination at a temperature of about 500 degrees Celsius. This material is abbreviated "FeZSM-5" on FIG. 1 and FIG. 2. The activity of this product was determined by performing Selective Catalytic Reduction (SCR) of $NO_x$ using two different gaseous mixtures of nitrogen oxides, 1:1 mixture of $NO/NO_2$ and a 4:1 mixture of $NO/NO_2$, in the presence of about 1 equivalent of ammonia and excess oxygen gas. The conversion data for both the 1:1 mixture and the 4:1 mixture are each reported in FIG. 1, which shows a graphical representation of percent $NO_x$ conversion as a function of temperature at a GHSV of 30,000 $hr^{-1}$ and in a temperature range from 100 degrees Celsius to 400 degrees Celsius. The curve with hollow diamond symbols shows the conversion data for the 1:1 mixture, and the curve with triangle symbols shows the conversion data for the 4:1 mixture. As FIG. 1 shows, the material prepared by subliming $FeCl_3$ onto ZSM-5 converts about 65 percent of the $NO_x$ from a feed stream of 4:1 $NO/NO_2$ at 200 degrees Celcius.

Cerium was added to the iron zeolite catalyst by immersing the catalyst into an aqueous solution of cerous nitrate. The drying and calcining steps converted the cerous nitrate into cerium oxides ($CeO_x$). The activity of this catalyst was measured, and was found not to be significantly different than the starting iron catalyst. The data are plotted on the graph shown in FIG. 3.

Figure 3:
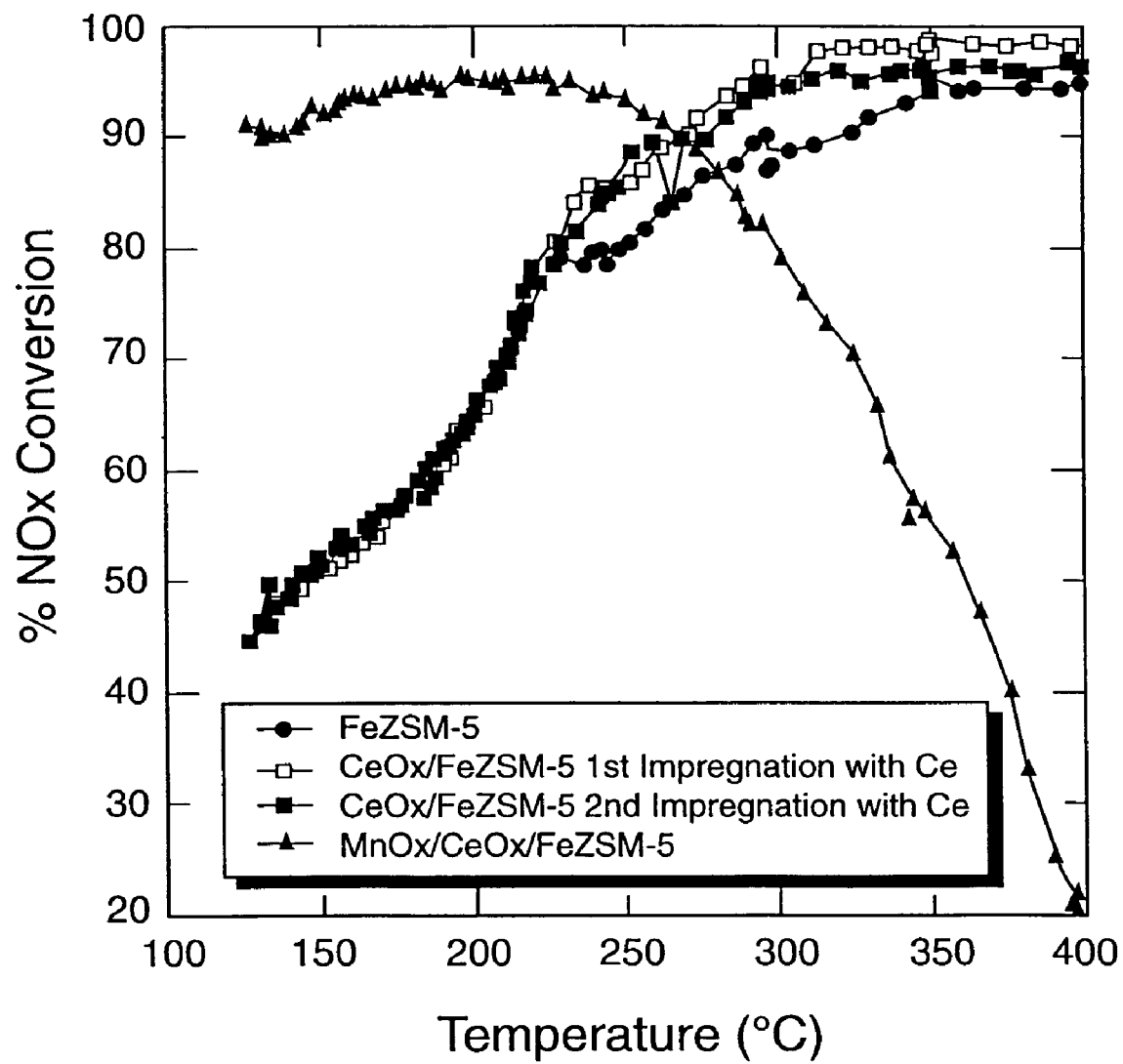
FIG. 3 shows a graphical representation of % NOx conversion versus temperature in the temperature range of from about 100 degrees Celsius to about 400 degrees Celsius for the following catalysts and conditions: FeZSM-5 (hollow circles); CeOx/FeZSM-5 after the first impregnation with Ce (hollow squares); CeOx/FeZSM-5 after the second impregnation with Ce (filled squares); and MnOx/CeOx/FeZSM-5 (hollow triangles). Cerium impregnation was accomplished by immersing iron zeolite into an aqueous solution of cerous nitrate, followed by drying and calcination to convert the cerous nitrate into cerium oxides ($CeO_x$). As FIG. 3 shows, the measured activity of the catalyst before and after impregnation were not significantly different. However, the addition of $MnO_x$ in combination with the cerium oxides improved the performance of the catalyst at lower temperatures (below about 250 degrees Celsius).

The iron- and cerium-containing product catalyst prepared as described above was immersed into an aqueous solution of manganese (II) nitrate, then dried and calcined. The drying and calcinations step are believed to convert at least some of the manganese nitrate into manganese oxides ($MnO_x$) and possibly mixed cerium-manganese oxides. The activity of this catalyst was determined by performing Selective Catalytic Reduction (SCR) with a gas mixture containing a 4:1 mixture of $NO/NO_2$, about one equivalent ammonia, and excess oxygen gas. The conversion data are shown in FIG. 1 (filled circles). As FIG. 3 shows, the addition of $MnO_x$ in combination with the cerium oxides improved the performance of the catalyst by acting as a potent oxidizer, as demonstrated by improved conversion of 4:1 mixture of $NO/NO_2$ at the lower temperatures.

Figure 2:
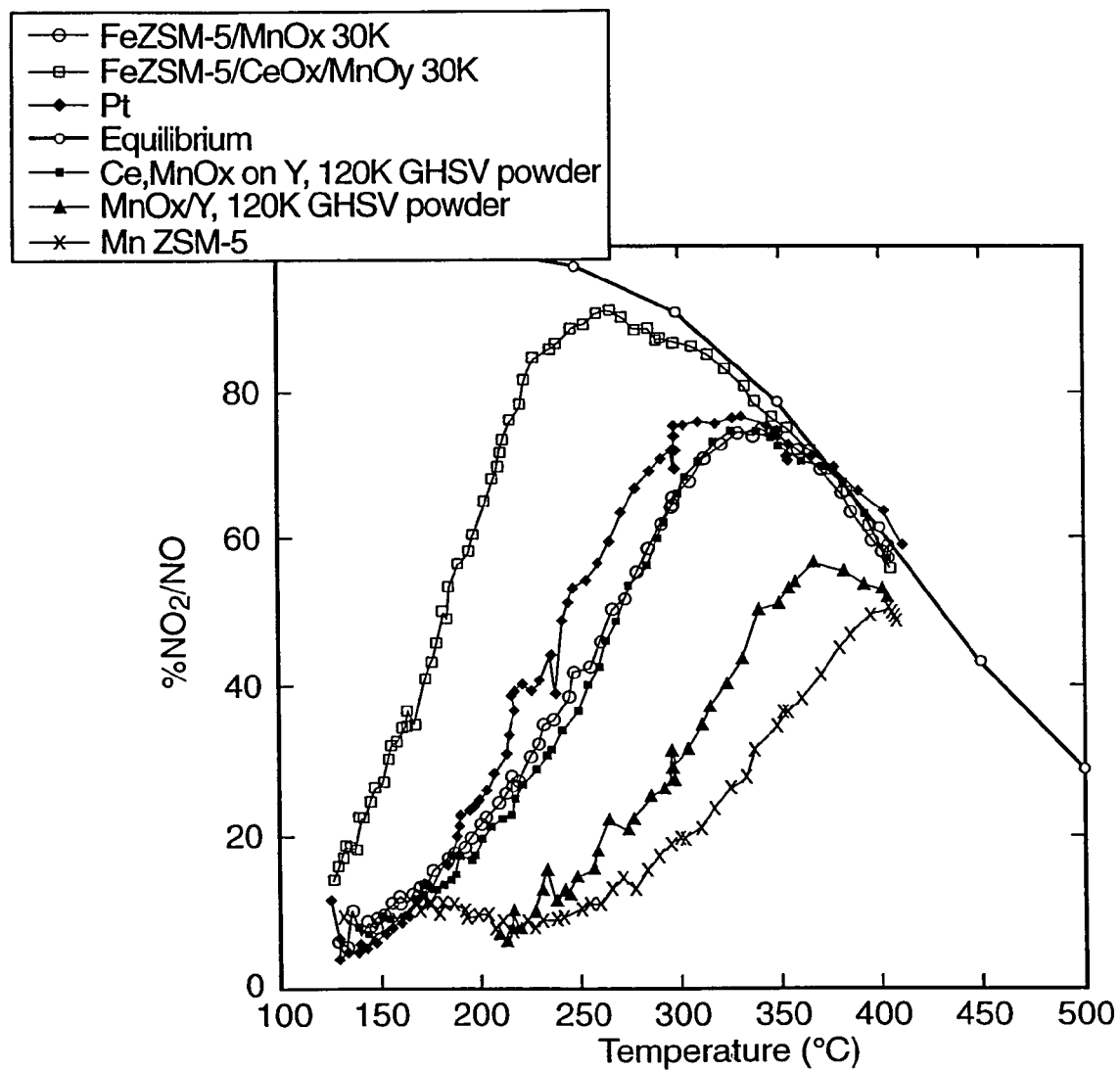
FIG. 2 shows a graphical representation of % ($NO_2$/(NO+$NO_2$)) as a function of temperature in the temperature range of from about 100 degrees Celsius to about 500 degrees Celsius for the following catalysts and conditions: monolith supported FeZSM-5/$MnO_x$, 30,000 $hr^{-1}$ (hollow circles); invention catalyst monolith-supported FeZSM-5/$CeO_x$/$MnO_y$, 30,000 $hr^{-1}$ (hollow squares); monolith supported Pt, space velocity of 30K (filled diamonds); powder catalyst $CeO_x$/$MnO_x$ on Y zeolite, 120,000 $hr^{-1}$ (filled squares); powder catalyst $MnO_x$ supported on Y zeolite 120,000 hr$^{-1}$ (filled triangles); and powder catalyst MnZSM-5, 30K GHSV (x-shaped symbols). The uppermost curve for temperatures up to about 350 degrees Celsius is the equilibrium curve for the oxidation of NO with oxygen to produce $NO_2$ (hollow circles).

The performance of the invention catalyst was compared to that of a catalyst powder described by Gonshin Qi et al. in the following paper: "Low-Temperature SCR of NO with $NH_3$ over USY-supported Manganese Oxide-Based Catalysts," Catalysis Letters, vol. 87, nos. 1-2. The Qi et al. powder catalyst is composed of 14 percent cerium and 6 percent manganese impregnated into ultrastable (i.e. high Si/Al) Y zeolite, which was reported to promote nearly 100 percent conversion of NO at 180 degrees Celsius under the disclosed experimental conditions. This powder catalyst produced 80 percent conversion when wet at a temperature of 150 degrees Celsius with a feed of 100% NO and a space velocity of 30,000 GHSV. It produced 55 percent conversion at a space velocity of 120,000 GHSV, a temperature of 150 degrees Celsius, and a gas composition of 4:1 $NO/NO_2$. This is an interesting catalyst and appears to be oxidizing a large fraction of NO to $NO_2$ to achieve these rates. For NO oxidation at 120,000 GHSV, the results are very similar to that for Platinum. As FIG. 1 and FIG. 2 show, the $CeO_x/MnO_x/Y$ catalyst of Qi, Yang, and Chang has even better low temperature performance than FeZSM-5. However, as FIG. 1 and FIG. 2 show, the catalyst of the present invention, $Ce/MnOx/FeZSM-5$ has substantially better low temperature performance.

Another aspect of the present invention relates to "dual bed" catalyst systems. As these new catalysts are too active for ammonia oxidation at high temperature but have fantastic low temperature performance, one solution to get a broader range of operation involves putting a "high temperature catalyst" such as FeZSM-5 that has excellent performance at high temperature in front of a bed of the hybrid catalysts of the invention. At high temperatures, the high temperature catalyst converts $NO_x$ to nitrogen with high efficiency. At low temperature, however, the "high temperature" catalyst is capable of only converting around 60 percent of the $NO_x$ at 200 degrees Celsius at 4:1 $NO/NO_2$ feeds. The hybrid catalyst would efficiently convert a large fraction of the remaining $NO_x$, likely attaining better than 90 percent conversion over a broad temperature range of about 150 degrees Celsius. This dual functioning catalyst bed enables $NO_x$ conversion over broad temperature ranges from 150 degrees Celsius to greater than 450 degrees Celsius, even up to 500 degrees Celsius.

The following EXAMPLES illustrate the operability of the invention.

EXAMPLE 1

Preparation of Fe ZSM-5 supported on cordierite monolith. Cylinders of cordierite monolith (10 mm in diameter×12 mm long; 400 cells per inch$^2$) were coated with H-ZSM-5 (ZEOLYST INTERNATIONAL) zeolite by dipping the monolith into an aqueous slurry of the zeolite powder followed by drying at 110 degrees Celsius. Several cycles of coating followed by drying were necessary to achieve a zeolite coating of around 20 to 24 percent by weight. The coated monolith was then calcined at a temperature of about 500 degrees Celsius. Iron was exchanged into the pores of the zeolites by the well-known method of gas-phase exchange using $FeCl_3$ as the volatile iron component. A piece of ZSM-5 coated cordierite monolith was placed into a boat downstream from a boat of anhydrous $FeCl_3$. The boats were contained within a quartz apparatus that was purged with dry nitrogen gas. The quartz apparatus was heated to a temperature of from between 300 degrees Celsius and 325 degrees Celsius to initiate the sublimation of $FeCl_3$. After the zeolite-coated monolith had changed to a color of yellow to yellow orange, the apparatus was cooled under dry nitrogen, and the resulting monolith was calcined in ambient air at a temperature of about 500 degrees Celsius to yield a catalyst referred to as Fe-ZSM-5/monolith. The catalyst gained approximately 7 percent by weight of $FeO_x$ based on the weight of the zeolite coating.

EXAMPLE 2

Testing of Fe ZSM-5 monolith catalyst. The Fe-ZSM-5/monolith prepared according to EXAMPLE 1 was tested for $NO_x$ conversion activity and for NO oxidation activity. To measure the activity for $NO_x$ conversion, the Fe-ZSM-5/monolith was placed into a 10 mm diameter quartz reactor tube. Reaction gases (NO, $NO_2$, $NH_3$, and $O_2$ in He) were blended using mass flow controllers to produce a gas mixture having 350 parts per million (ppm) total $NO_x$, 350 ppm $NH_3$, and 12 percent $O_2$; 5 percent steam was added using a syringe pump and an evaporator. The $NO:NO_2$ ratio was either 1:1 or 4:1. The space velocity was either 30,000 h$^{-1}$ or 60,000 h$^{-1}$. Products and reactants (NO, $NO_2$, $N_2O$, $NH_3$) were analyzed using a Fourier Transform Infrared (FT-IR) spectrometer with a heated cell having a 2 meter, or 10 meter, path length. Nitrogen was measured using a gas chromatograph. Operation of the reactor was automated. Catalytic performance data was obtained over the temperature range of 500 degrees Celsius to 120 degrees Celsius. The data is summarized in FIG. 1.

To determine the NO oxidation activity, a blend of 190 ppm NO and 12 percent $O_2$ in He was fed to the reactor, and the quantity of $NO_2$ to total $NO_x$ was measured using FT-IR. The results of the NO oxidation test are shown in FIG. 2.

EXAMPLE 3

Preparation of $MnO_x/Y$ catalyst. MnOx supported on zeolite Y catalyst comparable to a catalyst reported by Yang et al. ("A Superior Catalyst for Low-Temperature NO Reduction With $NH_3$," Chem. Commun. (2003), pp. 848-849) was prepared by incipient wetness impregnation. A six gram sample of zeolite Y (ZEOLYST®) was impregnated with approximately 3 cubic centimeters (cc) of 5 molar manganous nitrate solution to achieve a catalyst having approximately 10 to 15 percent by weight Mn. The catalyst was dried at a temperature of about 120 degrees Celsius, and then calcined at a temperature of about 500 degrees Celsius.

EXAMPLE 4

Testing of $MnO_x/Y$ catalyst. The $MnO_x/Y$ catalyst prepared in EXAMPLE 3 was tested for $NO_x$ conversion in an identical fashion as given in EXAMPLE 2. This catalyst was tested as a powder diluted in 1.5 cc of crushed cordierite. The GHSV of 120,000 h$^{-1}$ (based on volume of active catalyst powder) was chosen to make a good comparison to other catalytic results from monolith catalysts. The results for the 4:1 $NO/NO_2$ conditions are shown in FIG. 1. The NO oxidation activity of this catalyst at the same GHSV as the $NO_x$ conversion experiment and as a function of temperature was determined as described in EXAMPLE 2. The data are presented in FIG. 2.

EXAMPLE 5

Preparation and testing of $MnO_x/Y$ catalyst. A Ce, $MnO_x$ supported on zeolite Y catalyst comparable to the catalyst reported by Yang et al ("A Superior Catalyst for Low-Temperature NO Reduction With $NH_3$," Chem. Commun. (2003), pp. 848-849) was prepared by incipient wetness impregnation of a powdered sample of zeolite Y with an aqueous solution of Ce and Mn nitrates to achieve a 6% Mn, 14% Ce by weight catalyst. After the incipient wetness impregnation was performed, the catalyst was dried overnight at a temperature of about 120 degrees Celsius, and then calcined at a temperature of about 500 degrees Celsius. The product Ce,$MnO_x/Y$ catalyst was tested for $NO_x$ conversion as described in EXAMPLE 2. Ce,$MnO_x$/Y catalyst powder was diluted 50/50 with 1.5 cc of crushed cordierite. The GHSV of 120,000 $h^{-1}$ (based on volume of active catalyst powder) was chosen to make a good comparison to other catalytic results from monolith catalysts. The results for the 4:1 $NO/NO_2$ conditions are shown in FIG. 1.

The NO oxidation activity of this catalyst at the same GHSV as the $NO_x$ conversion experiment and as a function of temperature was determined as described in EXAMPLE 2. The data is presented in FIG. 2.

EXAMPLE 6

Preparation of $CeO_x$—Fe-ZSM-5/monolith catalyst. The Fe-ZSM-5/monolith catalyst from EXAMPLE 1 was dip coated in an aqueous 4M cerous nitrate solution. The excess solution was shaken off, and the catalyst dried at a temperature of about 120 degrees Celsius. The catalyst was then calcined at a temperature of about 500 degrees Celsius. The product was $CeO_x$—Fe-ZSM-5/monolith catalyst.

EXAMPLE 7

Testing of $CeO_x$—Fe-ZSM-5/monolith catalyst The $CeO_x$—Fe-ZSM-5/monolith catalyst was tested for $NO_x$ conversion in an identical fashion as described in EXAMPLE 2. $CeO_x$—Fe-ZSM-5/monolith catalyst powder was diluted 50/50 with 1.5 cc of crushed cordierite. The GHSV of 120,000 $h^{-1}$ was chosen to make a good comparison to other catalytic results from monolith catalysts. The results for the 4:1 $NO/NO_2$ conditions are shown in FIG. 3.

EXAMPLE 8

Preparation of $CeO_x$—Fe-ZSM-5/monolith catalyst. The $CeO_x$—Fe-ZSM-5/monolith catalyst from EXAMPLE 6 was impregnated a second time by dip coating in an aqueous solution of 4M cerous nitrate. The catalyst was dried and calcined as described in EXAMPLE 6.

EXAMPLE 9

Testing of $CeO_x$—Fe-ZSM-5/monolith catalyst. The $CeO_x$—Fe-ZSM-5/monolith catalyst of EXAMPLE 8 (having the additional impregnation/calcination treatment) was tested for $NO_x$ conversion using the identical conditions as in EXAMPLE 2. The test result data showed little difference from the data for the catalyst given in EXAMPLE 7. The data are plotted in FIG. 3.

EXAMPLE 10

Preparation of Mn,$CeO_x$—Fe-ZSM-5 monolith catalyst. The $CeO_x$—Fe-ZSM-5/monolith catalyst from EXAMPLE 7 was impregnated with Mn by dip coating the monolith into an aqueous solution of 1 molar manganous nitrate. The excess solution was shaken off and the catalyst was then dried at a temperature of about 120 degrees Celsius and afterward calcined at a temperature of about 500 degrees Celsius. The product was the catalyst Mn,$CeO_x$—Fe-ZSM-5.

EXAMPLE 11

Testing of Mn, $CeO_x$—Fe-ZSM-5 monolith catalyst. The Mn,$CeO_x$—Fe-ZSM-5/monolith catalyst prepared as described in EXAMPLE 10 was tested for $NO_x$ conversion using the same conditions as in EXAMPLE 2. These data are shown in FIG. 1.

The NO oxidation capability of this catalyst was tested using 190 ppm NO as described in EXAMPLE 2. The data are shown in FIG. 3.

EXAMPLE 12

Preparation of five Mn,$CeO_x$—Fe-ZSM-5 monolith catalysts. A series of catalysts were prepared to examine the relationship of the amount of Ce and Mn and the effect on catalytic activity for $NO_x$ conversion and NO oxidation. Five pieces of cordierite monolith (10 mm diameter, 12 mm long, 400 cells per inch) were coated with an aqueous slurry of $NH_4^+$-ZSM-5. The average zeolite loading was 34 percent by weight. The catalysts were dried, calcined, and treated with $FeCl_3$ as in EXAMPLE 1. These five identically prepared Fe-ZSM-5/monolith catalysts were then impregnated with varying amounts of Ce and Mn by dip-coating them into aqueous solutions of cerium nitrate and manganese nitrate as follows:

Catalyst A was prepared by dip-coating a monolith into solutions of 2 molar cerous nitrate and 2 molar manganous nitrate.

Catalyst B was prepared by dip-coating a monolith into solutions of 1 molar cerous nitrate and 1 molar manganous nitrate.

Catalyst C was prepared by dip-coating a monolith into solutions of 0.5 molar cerous nitrate and 0.5 molar manganous nitrate.

Catalyst D was prepared by dip-coating a monolith into solutions of 1 molar manganous nitrate and 0.5 molar cerous nitrate.

Catalyst E was prepared by dip-coating a monolith into solutions of 0.5 molar manganous nitrate and 1 molar cerous nitrate.

After dip-coating each monolith, the excess solution was removed from each of the monolith pieces, and all five pieces of catalyst were dried and calcined as described before.

EXAMPLE 13

Testing of five Mn, $CeO_x$—Fe-ZSM-5 monolith catalysts. The catalysts A-E from EXAMPLE 12 were tested for $NO_x$ conversion and NO oxidation using the method given in EXAMPLE 2. The results of $NO_x$ conversion and NO conversion are given in FIG. 4a and FIG. 4b.

EXAMPLE 14

Figure 4A:
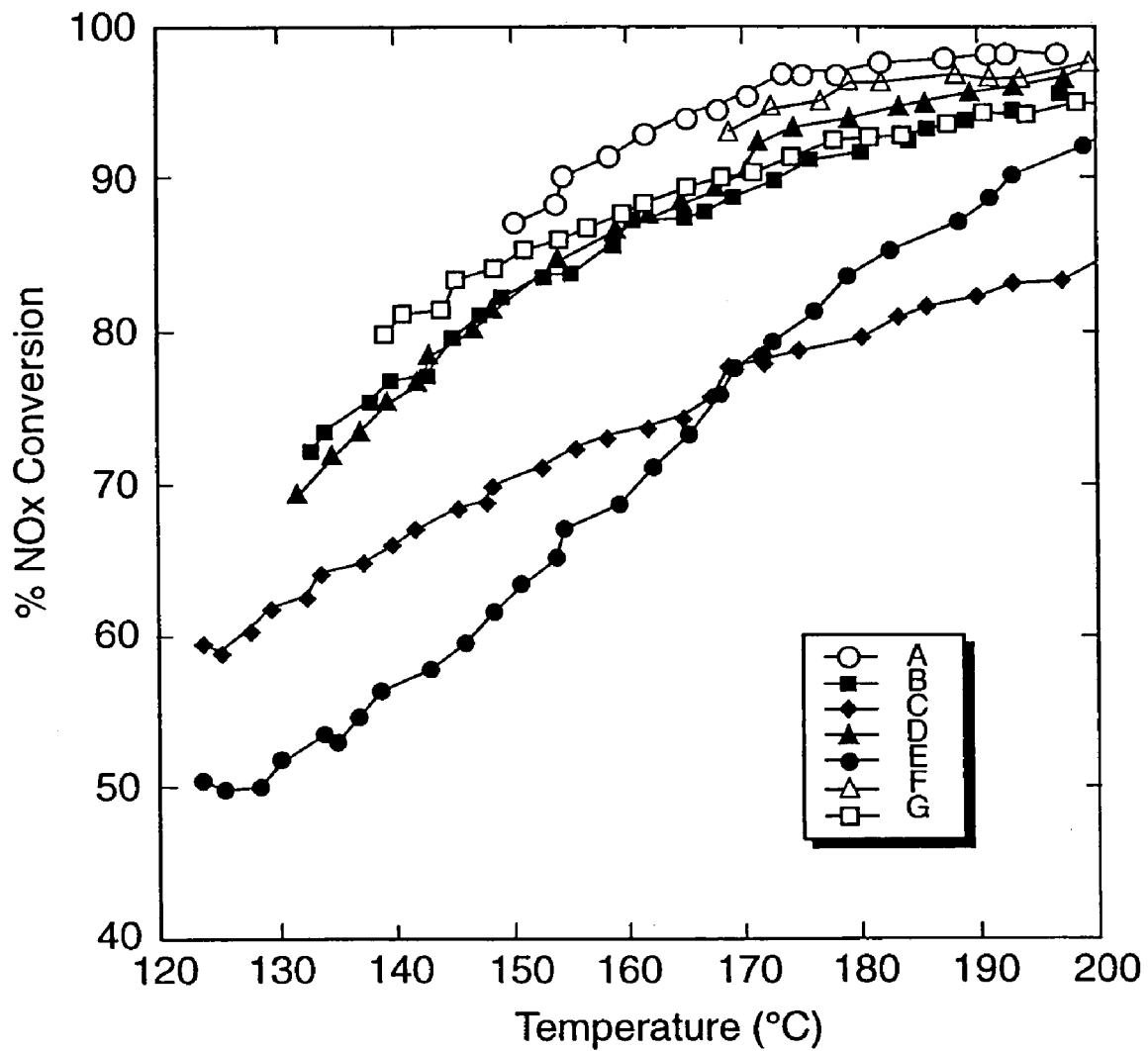
FIG. 4a and FIG. 4b show graphs related to results of $NO_x$ conversion and NO conversion for catalysts A, B, C, D, and E prepared by dip coating a monolith with catalyst solution, drying, and calcination. Catalyst A was prepared by dip-coating a monolith into solutions of 2 molar cerous nitrate and 2 molar manganous nitrate. Catalyst B was prepared by dip-coating a monolith into solutions of 1 molar cerous nitrate and 1 molar manganous nitrate. Catalyst C was prepared by dip-coating a monolith into solutions of 0.5 molar cerous nitrate and 0.5 molar manganous nitrate. Catalyst D was prepared by dip-coating a monolith into solutions of 1 molar manganous nitrate and 0.5 molar cerous nitrate. Catalyst E was prepared by dip-coating a monolith into solutions of 0.5 molar manganous nitrate and 1 molar cerous nitrate. Catalyst A was re-impregnated with the aqueous 2 molar solution of manganese nitrate and cerium nitrate, dried, and calcined to generate Catalyst F. Catalyst F was impregnated again in the cerium and manganese solution, dried, and calcined to generate Catalyst G. The results of $NO_x$ conversion and NO conversion for catalyst F and for catalyst G are also shown in FIG. 4a and FIG. 4b.
Figure 4B:
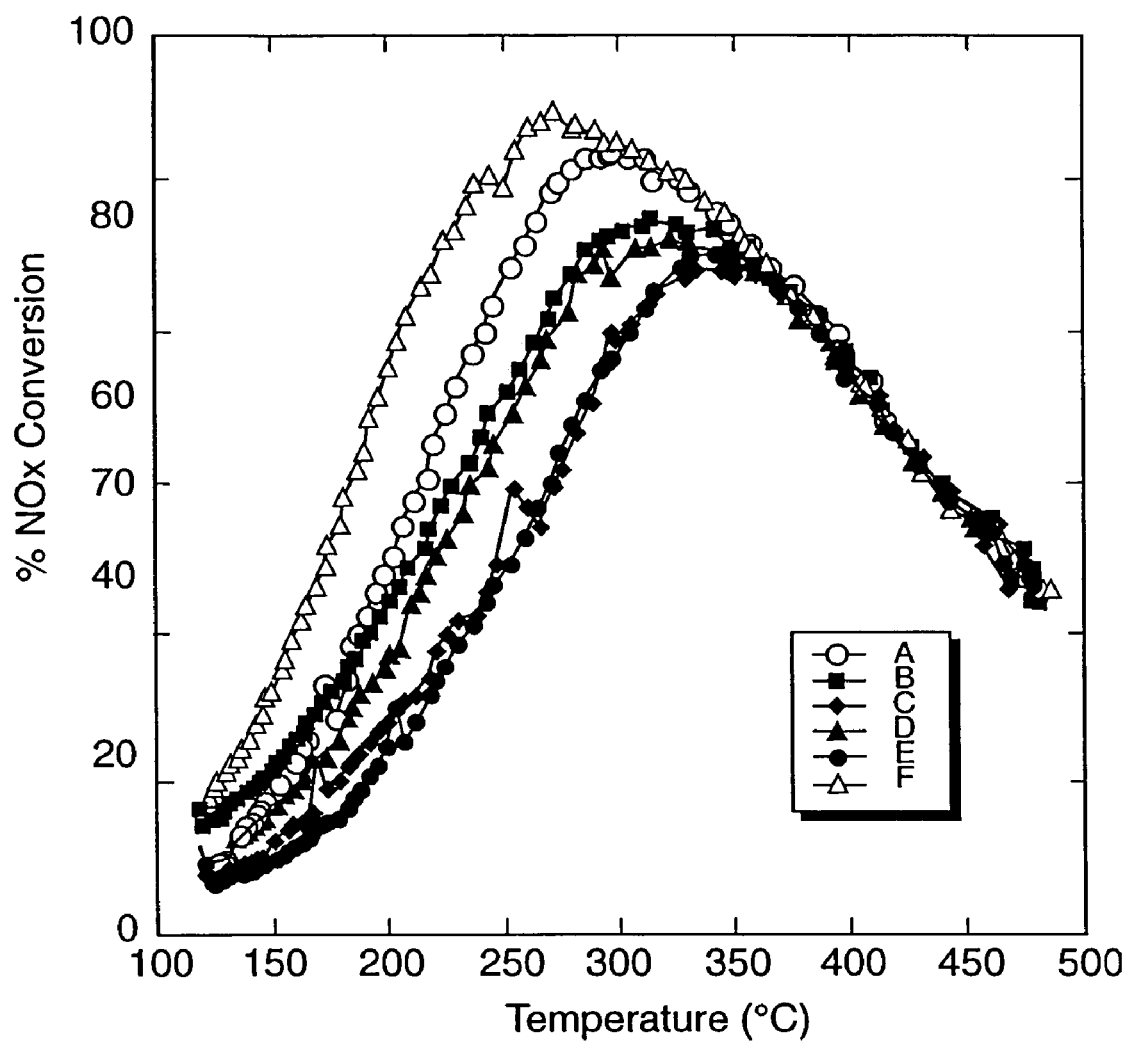

Preparation of two Mn, $CeO_x$—Fe-ZSM-5 monolith catalysts. Catalyst A from EXAMPLE 12 was re-impregnated with the aqueous 2 molar solution of manganese nitrate and cerium nitrate, dried, and calcined to generate Catalyst F. The $NO_x$ conversion and NO conversion for catalyst F were measured. Afterward, catalyst F was impregnated again in the cerium and manganese solution, dried, and calcined to generate Catalyst G. The results of $NO_x$ conversion and NO conversion for catalyst F and for catalyst G are shown in FIG. 4a and FIG. 4b.

EXAMPLE 15

Oxidation of ammonia using Mn, $CeO_x$—Fe-ZSM-5 monolith catalyst. Catalyst F was used to demonstrate the capability of using Mn,$CeO_x$—Fe-ZSM-5 monolith catalyst to oxidize ammonia and thereby minimize the loss of any excess or unconsumed ammonia (sometimes known as the ammonia 'slip') into the environment. Catalyst F was placed into a 10 mm diameter quartz reactor. A gas mixture including about 500 ppm of $NH_3$ and 12 percent $O_2$ diluted in He were delivered to the reactor along with 5 percent steam. The conversion of ammonia was monitored by FT-IR and gas chromatography (GC) to detect $N_2$. At a temperature of about 300 degrees Celsius, the ammonia was completely converted. The selectivity to $N_2$ was about 80 percent, and the selectivity to $NO_x$ was about 20 percent.

EXAMPLE 16

Resistance of Mn, $CeO_x$—Fe-ZSM-5 monolith catalyst to hydrocarbon poisoning. Catalyst F was used to demonstrate the resistance of Mn,$CeO_x$—Fe-ZSM-5 monolith catalyst to hydrocarbon poisoning. While maintaining the catalyst at a temperature of 177 degrees Celsius, a $NO/NO_2$ ratio of 4:1, and the conditions given in EXAMPLE 2, the $NO_x$ conversion of 95 percent was measured. A train of 4 pulses of 10 microliters of liquid toluene injected at 4 minute intervals were then vaporized and delivered upstream of the catalyst bed. After each pulse, a sharp decrement in $NO_x$ conversion was noted, declining by about 10 points, but then rapidly recovering to above 90 percent. After the 4 pulses of toluene, $NO_x$ conversion was greater than 90 percent, and recovered to 95 percent conversion in less than 3 hours.

EXAMPLE 17

Figure 5:
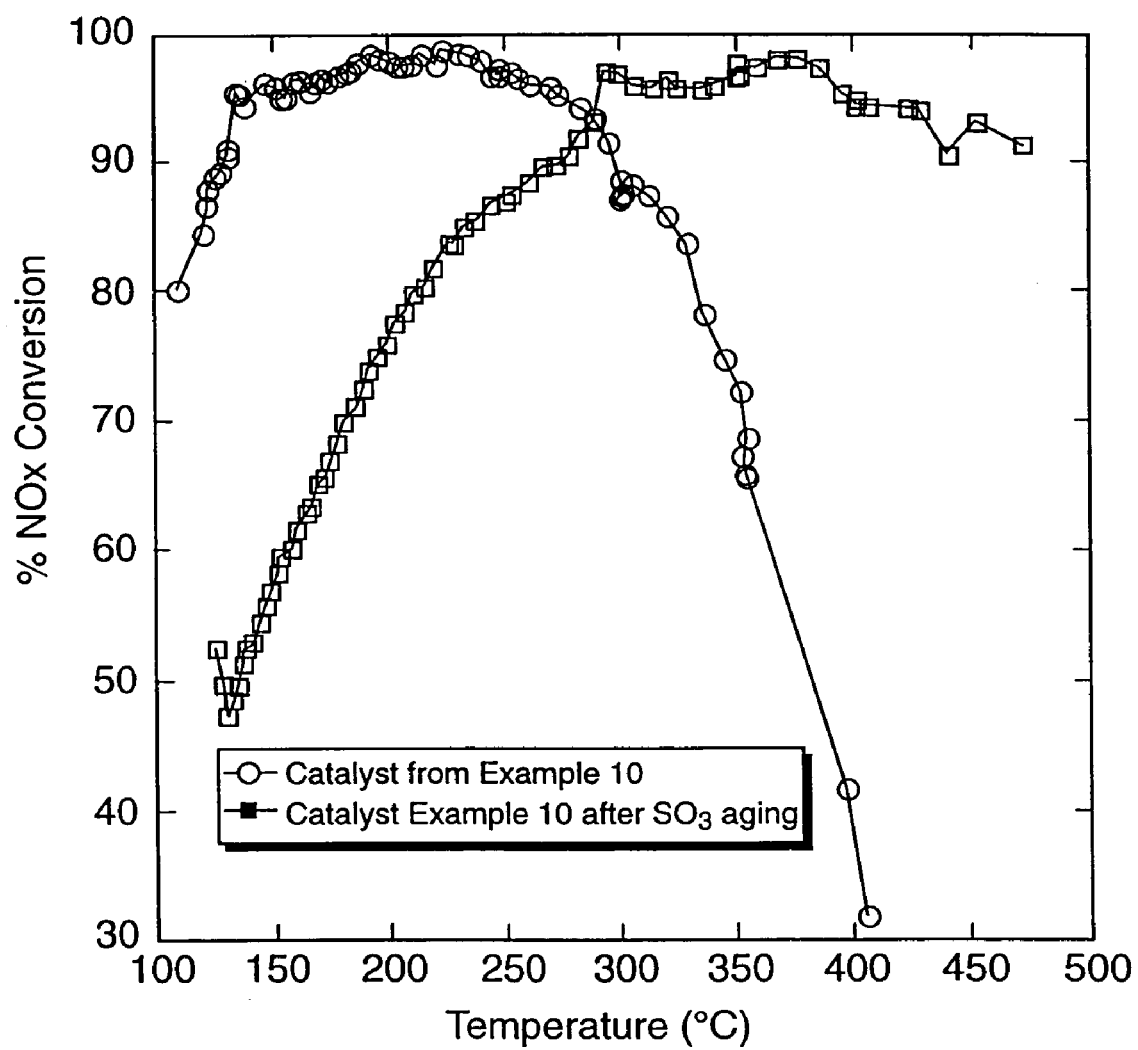
FIG. 5 shows results related to the stability of the Ce, $MnO_x$ Fe-ZSM-5/monolith catalyst of the present invention to aging using sulfur trioxide ($SO_3$).

Stability of Ce, $MNO_x$ Fe-ZSM-5/monolith catalyst to aging with $SO_3$. The Ce, $MnO_x$ Fe-ZSM-5/monolith catalyst from EXAMPLE 10 was tested for stability to $SO_3$ aging. A blend of 45 ppm $SO_x$, mostly $SO_3$, in air with steam was passed over the catalyst for 15 hours while the temperature of the catalyst was held at a temperature of about 350 degrees Celsius. The catalyst was then heated briefly to a temperature of about 500 degrees Celsius, and the $NO_x$ conversion in a 4:1 $NO/NO_2$ blend was tested as outlined in EXAMPLE 2. The data are shown graphically in the plot shown in FIG. 5. The shape of the curve for $NO_x$ conversion changed, but $NO_x$ conversion remained greater than 80 percent at a temperature of about 200 degrees Celsius, and was greater than 90 percent from a temperature of about 275 degrees Celsius to a temperature of about 475 degrees Celsius.

EXAMPLE 18

Figure 6:
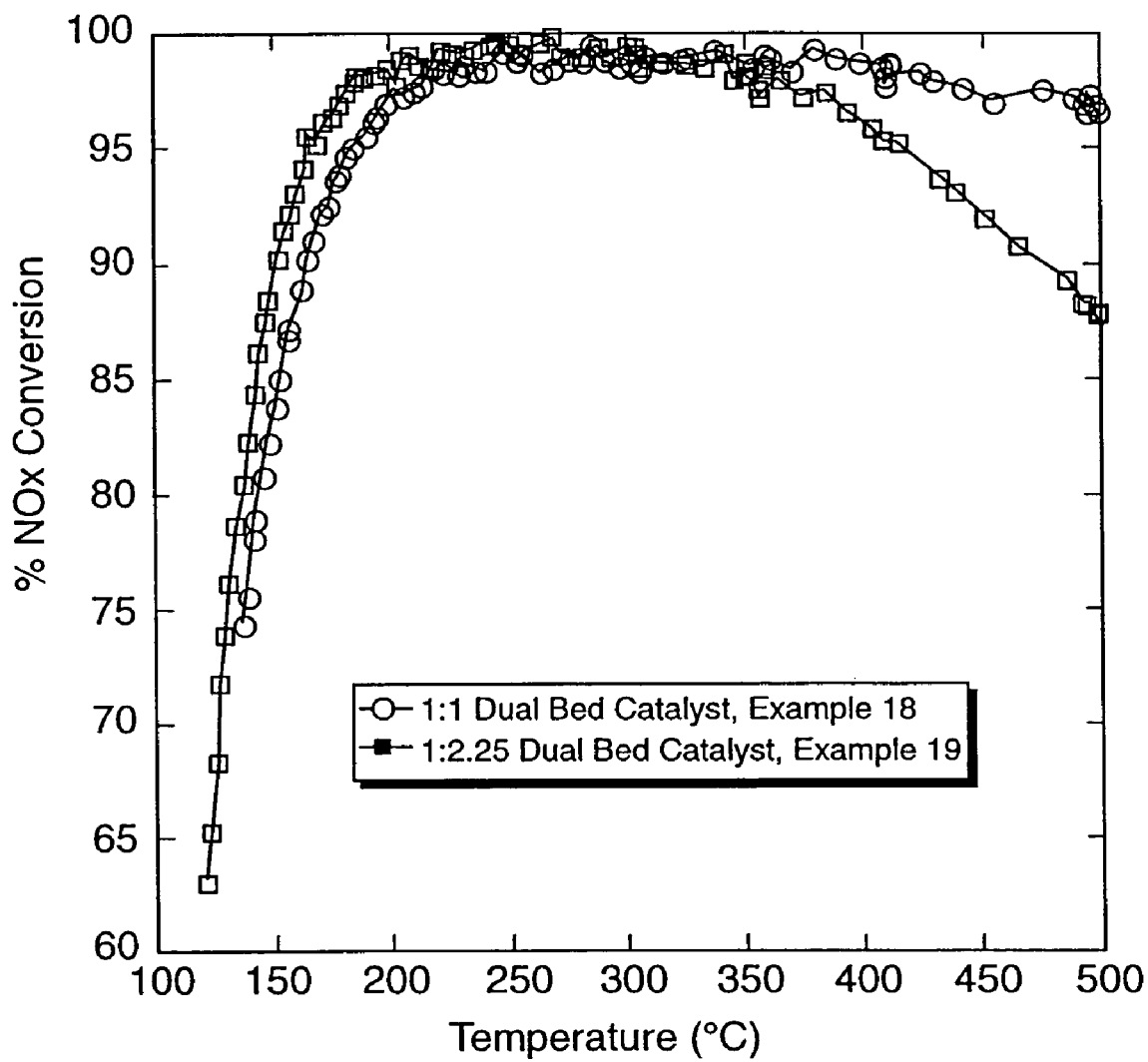
FIG. 6 shows the results of NOx conversion as a function of temperature for a dual bed catalyst of the present invention.

Dual bed catalyst. To provide a broad temperature window process, dual bed catalysts were prepared. Catalyst F from EXAMPLES 14, 15, and 16 was placed downstream from a 10 mm diameter×12 mm long piece of Fe-ZSM-5/monolith catalyst prepared as described in EXAMPLE 1. The dual bed catalyst was tested as described in EXAMPLE 2, except that the flow was doubled to account for the doubling of volume of the overall bed; thus the GHSV for the dual bed was 30,000 $h^{-1}$. The $NO_x$ conversion as a function of temperature is shown in FIG. 6.

EXAMPLE 19

Dual bed catalyst. A dual bed catalyst was prepared by placing a 10 mm diameter×5.4 mm diameter piece of Fe-ZSM-5 monolith catalyst prepared as in EXAMPLE 1 upstream from catalyst F (from EXAMPLE 18). The flow rate was adjusted to give an overall GHSV of 30,000 $h^{-1}$. The results of the $NO_x$ conversion test are shown in FIG. 6.

EXAMPLE 20

Stability of Dual Bed Catalyst to Hydrocarbon Poisoning. The dual bed catalyst from EXAMPLE 19 was subjected to the standard 4:1 $NO/NO_2$ ratio $NO_x$ conversion conditions at a temperature of 160° C. $NO_x$ conversion was constant at 85% prior to introduction of toluene. Toluene vapor was introduced at a concentration of 100 ppm. During the next 2 hours, the conversion of $NO_x$ did not change. The concentration of toluene was then increased to 1000 ppm. Over the next two hours, the $NO_x$ conversion slowly dropped to about 65 percent. Upon heating the catalyst bed to a temperature of about 250 degrees Celsius with 1000 ppm toluene still in the feed, $NO_x$ conversion rose to about 85 percent and was steady. All catalytic activity was regained when toluene was removed from the feed and the catalyst bed was heated briefly to a temperature of 250-300° C.

Lean $NO_x$ traps are approach for the conversion of $NO_x$ from lean burn engines. These traps operate by adsorbing $NO_2$ with an adsorbent, followed by reacting the adsorbed $NO_2$ to $N_2$. While this approach provides yet another way to abate $NO_x$ at higher temperatures, it is necessary to convert NO to $NO_2$ in order for the trap to be effective. This conversion of NO to $NO_2$ is difficult at the lower temperatures of the desired operating range, particularly at temperatures from about 100 degrees Celsius to about 250 degrees Celsius. One aspect of the present invention is related to a potent catalyst for the catalytic oxidation of NO to $NO_2$ to enable a lean $NO_x$ trap to operate more efficiently over a broader temperature range, particularly at temperatures below 250 degrees Celsius. The ability of invention catalysts having Mn and Ce to oxidize NO to $NO_2$ at low temperatures allows lean $NO_x$ traps to operate more effectively at lower temperature by increasing the amount of $NO_2$ in the gas, and thus increasing the amount of $NO_x$ trapped as $NO_2$. The invention catalyst having manganese and cerium is, therefore, a low temperature catalyst that, when placed upstream from a lean $NO_x$ trap catalyst, improves the low temperature efficiency of the trap device.

The foregoing description of the invention has been presented for purposes of illustration and description and is not intended to be exhaustive or to limit the invention to the precise form disclosed, and obviously many modifications and variations are possible in light of the above teaching. For example, it is believed that while iron was incorporated into the zeolite structure by sublimation, iron may also be incorporated by ion exchange techniques as well.

The embodiment(s) were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for improving the low temperature performance of a lean $NO_x$ trap comprising putting a catalyst upstream of a lean $NO_x$ trap, the catalyst comprising a medium pore zeolite impregnated with iron, cerium, and manganese, and then contacting the catalyst with NO and oxygen, whereby the catalyst substantially oxidizes the NO to $NO_2$ to produce a $NO_2$ enriched stream that improves the low temperature performance of the lean $NO_x$ trap.

* * * * *